US008919713B2

(12) United States Patent
Reusser

(10) Patent No.: US 8,919,713 B2
(45) Date of Patent: Dec. 30, 2014

(54) PAINT CAN AND ACCESSORIES HOLDER WITH MAGNETS

(76) Inventor: Dennis W. Reusser, Olathe, KS (US)

( * ) Notice: Subject to any disclaimer, the term of this patent is extended or adjusted under 35 U.S.C. 154(b) by 0 days.

(21) Appl. No.: 13/365,607

(22) Filed: Feb. 3, 2012

(65) Prior Publication Data

US 2012/0199710 A1 Aug. 9, 2012

Related U.S. Application Data

(60) Provisional application No. 61/439,373, filed on Feb. 4, 2011.

(51) Int. Cl.

| | |
|---|---|
| ***E06C 7/14*** | (2006.01) |
| *A46B 17/02* | (2006.01) |
| *A47B 96/06* | (2006.01) |
| *A47F 5/00* | (2006.01) |
| *A47F 5/08* | (2006.01) |
| *A47H 1/10* | (2006.01) |
| *E04G 3/00* | (2006.01) |
| *A47G 29/00* | (2006.01) |
| *F16M 11/00* | (2006.01) |

(52) U.S. Cl.

USPC ........ 248/210; 248/110; 248/205.1; 248/211; 248/687

(58) Field of Classification Search

CPC ............. E06C 7/14; E06C 7/143; E06C 7/48; E06C 7/16; E06C 7/482; E06C 7/146; B44D 3/14; B44D 3/12; B44D 3/126; E04G 5/00

USPC ........................... 248/210, 211, 238; 182/129

See application file for complete search history.

(56) References Cited

U.S. PATENT DOCUMENTS

| | | | | |
|---|---|---|---|---|
| 4,099,693 | A | 7/1978 | Blann | |
| 4,523,733 | A | 6/1985 | Lunden, Jr. | |
| 4,662,594 | A * | 5/1987 | Dubis | 248/238 |
| 4,702,446 | A | 10/1987 | Brown | |
| 4,824,060 | A | 4/1989 | Korda | |
| 5,316,251 | A | 5/1994 | McGraw | |
| 5,624,093 | A * | 4/1997 | Gemmell | 248/231.41 |
| 5,649,682 | A | 7/1997 | Martin | |
| 5,845,742 | A | 12/1998 | Tade | |
| 5,934,632 | A | 8/1999 | Weaver | |
| 5,960,905 | A * | 10/1999 | Gardner | 182/129 |
| 6,260,663 | B1 * | 7/2001 | Combs | 182/129 |
| 7,475,859 | B2 * | 1/2009 | Selders | 248/304 |
| 2007/0221802 | A1 * | 9/2007 | New et al. | 248/210 |
| 2008/0054030 | A1 * | 3/2008 | Diaz | 224/148.7 |
| 2011/0057079 | A1 | 3/2011 | Reusser | |

* cited by examiner

*Primary Examiner* — Jonathan Liu
*Assistant Examiner* — Taylor Morris
(74) *Attorney, Agent, or Firm* — Stinson Leonard Street LLP; Mark C. Young

(57) ABSTRACT

The disclosure and claims herein are directed to a paint can holder for attachment to a ladder, the paint can holder comprising a shaft having a first end, a second end, a top surface with a first friction area at the first end of the shaft, and a bottom surface with a second friction area at the second end of the shaft, configured such that inserting the shaft inside a rung of the ladder secures the paint can holder to the ladder, and a holding portion coupled to the second end of the shaft, the holding portion comprising a groove configured to receive a handle of a paint can, at least one opening, and at least one magnetic area.

13 Claims, 3 Drawing Sheets

PAINT CAN AND ACCESSORIES HOLDER WITH MAGNETS

CROSS-REFERENCE TO RELATED APPLICATIONS

This application is based on and claims priority to U.S. Provisional Application Ser. No. 61/439,373, filed on Feb. 4, 2011, which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

This invention relates to a device for securely attaching a paint bucket and other accessories to a hollow rung extension ladder so that the contents are conveniently available to a user and so that the paint bucket can be easily removed and relocated without limiting the user's activities. The primary use of the invention is to hold a can of paint and painting accessories on a ladder while the ladder is being used by a painter, but the device may also be used as a holder for tools or other items.

2. Description of Related Art

Many prior patents related to extension ladders have attempted to address the issue of attaching a paint can or accessories to the ladder. However, most devices in prior patents were bulky and/or difficult to set up and use. Several examples of patents disclosing holders for hollow-rung ladders are cited below.

U.S. Pat. No. 4,523,733 to Lunden, Jr. discloses a rigid tube with a suspended shelf on one of its ends. When the opposite end of the tube is inserted into the hollow rung of a ladder, the rigid tube is thereby supported, which in turn supports the suspended shelf on which a paint can is placed.

U.S. Pat. No. 4,702,446 to Brown describes a "ladder caddy" which again uses a rigid tubing member to be inserted into a hollow ladder rung. Brown discloses a snap-lock holding band. The paint can is placed within the band, which is then snapped closed, tightening around the can. The band itself is attached to the rigid tube through various wooden parts, such that the band and paint can held therein hang below the rigid tube which has been inserted into the hollow ladder rung.

U.S. Pat. No. 4,824,060 to Korda discloses a rod which is long enough to extend completely through a hollow ladder rung. One end of the rod is threaded, thereby allowing a paint can holder to be secured by a wing nut to the rod. The opposing end of the rod has a pivoting latch plate which by gravity drops down to a vertical position once the rod has been inserted completely through the hollow ladder rung, thus securing the rod in place in the rung. The paint can holder portion is a U-shaped frame with a cylindrical top piece conforming to the diameter of the paint can and is secured to the end of the rod. The paint can rests on the U-shaped frame and is held in place by the cylindrical top piece.

U.S. Pat. No. 5,934,632 to Weaver discloses a utility can holder for use with hollow rung ladders; The paint can or bucket rests on the upper surface of an annular support member. This support member is rigidly attached to a rung insert member that extends completely through the hollow ladder rung from one side to the other. Flexible tabs are compressed prior to insertion of this member into the rung which open on the other side of the ladder to prevent inadvertent extraction from the rung. The annular support member is rotatable within the rung to allow leveling of the paint bucket. This rotatability may cause instability as the user extracts paint from the bucket. The positioning and attachment of the paint bucket on the ladder is a two-step procedure. The rung insert member must be secured within the selected hollow ladder rung prior to inserting the paint bucket into the container recess. The insertion of the rung insert member into the hollow rung is a "two-hand operation", involving holding the holder with one hand and depressing the flexible tabs with the other hand.

U.S. Pat. No. 5,845,742 to Tade describes a paint can or bucket hanging by its handle from a T-shaped support member which is attached to one end of an extension member. The rod-like extension member is inserted into a hollow ladder rung. The paint bucket is supported by its handle which is vertically disposed directly above the lip of the paint bucket.

U.S. Pat. No. 5,649,682 to Martin supports a container within a clamping circular band with a flattened projecting arm that is inserted into a hollow ladder rung. The support part of the projection arm that is inserted into the hollow ladder rung is relatively short and is not attached securely within the hollow rung. There is a possibility that the arm may be inadvertently extracted from the rung during usage.

U.S. Pat. No. 5,316,251 to McGraw is directed at leveling a paint can in two dimensions. The paint can rests upon a wraparound frame that is elliptically shaped and may be either closed or open at one end. This frame is rigidly attached to a cylindrical handle that is inserted into a hollow ladder rung to support the frame and the paint can. The paint bucket may potentially be dislodged from its position atop the frame and spill some or all of its contents, or be a safety hazard to persons on the ground.

The prior art has disadvantages that the present invention overcomes. These disadvantages are inherent in the prior art, including over-complexity and inconvenience of use. The prior art has a basic overall security issue, due generally to the approach to attachment of the paint can to the hollow ladder rung. The paint bucket has the capability to swing or rotate about the horizontally disposed axis established by the support arm inserted in the hollow rung. This is generally done to maintain the paint bucket in a level, upright orientation. The disadvantage of this approach is that it creates a perception of insecurity on the part of the user due to movement of the paint bucket while paint is being extracted with a brush, especially as the level of the paint in the bucket decreases. Additionally, to work properly, the devices in the prior art require multiple hands, multiple steps, assembly of the paint can holder, or assembly of the paint can holder to the ladder. A simple, easy-to-use paint can holder that securely supports a paint can on the side of a ladder is needed.

BRIEF SUMMARY OF THE INVENTION

The disclosure and claims herein are directed to a paint can holder for attachment to a ladder, the paint can holder comprising a shaft having a first end, a second end, a top surface with a first friction area at the first end of the shaft, and a bottom surface with a second friction area at the second end of the shaft, configured such that inserting the shaft inside a rung of the ladder secures the paint can holder to the ladder, with a holding portion coupled to the second end of the shaft, the holding portion comprising a groove configured to receive a handle of a paint can, at least one opening, and at least one magnetic area.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF EXEMPLARY EMBODIMENTS

The disclosure and claims herein are directed to a paint can holder for attachment to a ladder, the paint can holder comprising a shaft having a first end, a second end, a top surface with a first friction area at the first end of the shaft, and a bottom surface with a second friction area at the second end of the shaft, configured such that inserting the shaft inside a rung of the ladder secures the paint can holder to the ladder, with a holding portion coupled to the second end of the shaft, the holding portion comprising a groove configured to receive a handle of a paint can, at least one opening, and at least one magnetic area. The opening is configured to hold a Paintbrush, wire brush, or paint scraper. The magnetic area is configured to magnetically hold a paintbrush or paint scraper. The shaft is configured to be inserted into a rung of a ladder. The weight of the paint can on the holding portion causes the shaft to pivot inside the rung and become leveraged inside the rung such that the first and second friction areas contact the inside of the rung and hold the paint can holder securely in place.

Figure 1:
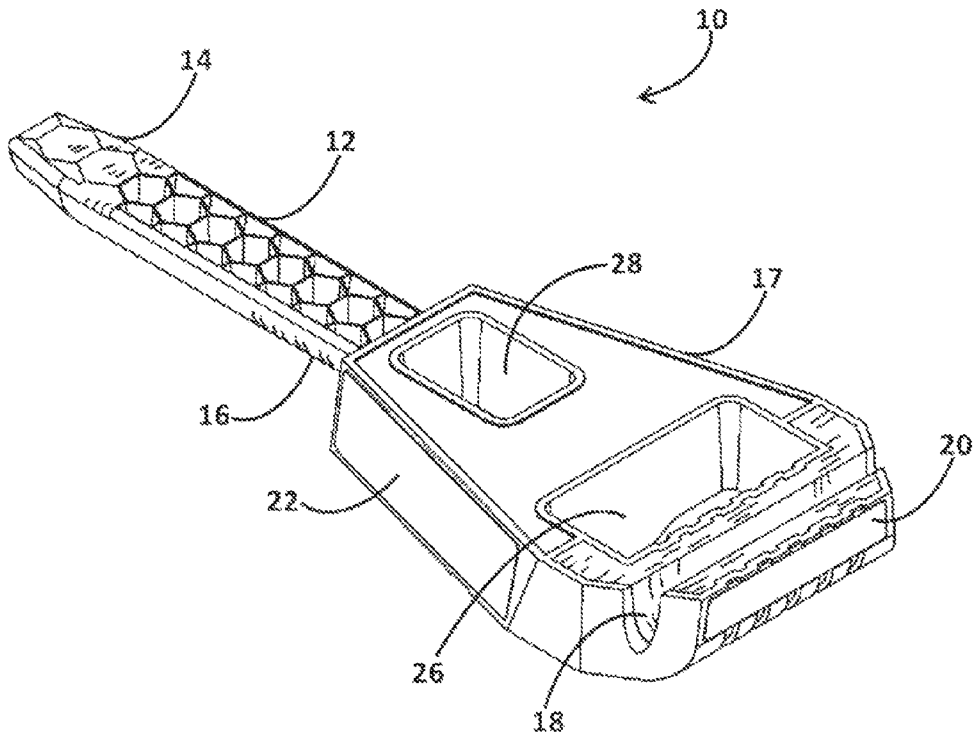
FIG. 1 shows a top side perspective view of an exemplary embodiment of the paint can holder described herein.
Figure 2:
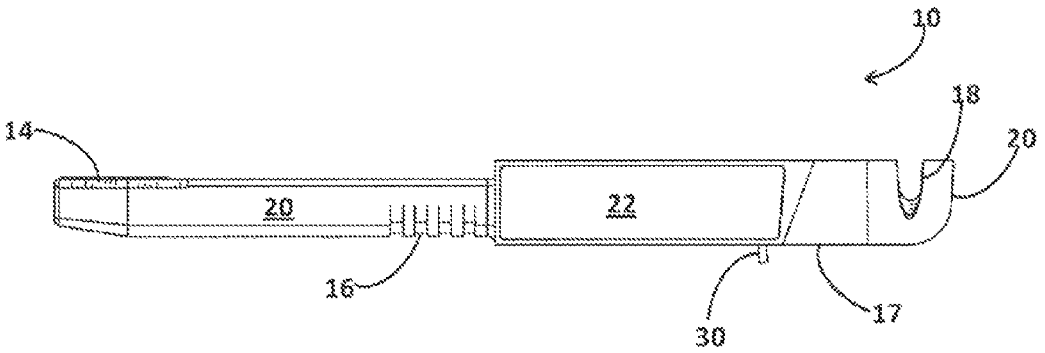
FIG. 2 shows a side view of the paint can holder of FIG. 1.
Figure 3:
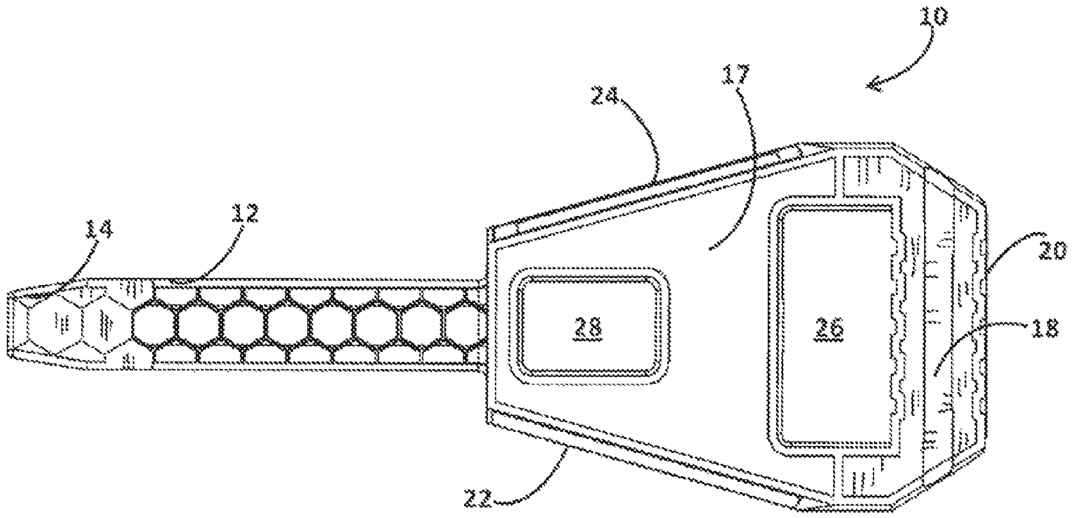
FIG. 3 shows a top view of the paint can holder of FIG. 1.

Referring to FIGS. 1, 2, and 3, a paint can holder 10 comprises a shaft 12 and a holder portion 17. Shaft 12 has a first friction area 14 on the top of shaft 12 near the end of shaft 12 furthest from holder portion 17, and a second friction area 16 on the bottom of shaft 12 near the end of shaft 12 closest to holder portion 17. In an exemplary embodiment, first and second friction areas 14, 16 each do not cover the entire length of shaft 12. In a first alternative embodiment, first and second friction areas 14, 16 each cover less than about 50% of the length of shaft 12. In a second alternative embodiment, first and second friction areas 14, 16 each cover from about 5% to about 33% of the length of shaft 12. In a third alternative embodiment, first and second friction areas 14, 16 each cover about 25% of the length of shaft 12. First friction area 14 may cover the same percentage of shaft 12 as second friction area 16, or first and second friction areas 14, 16 may cover a different percentage of shaft 12. In one exemplary embodiment shaft 12 is D-shaped. In an alternative embodiment shaft 12 is round, square, or rectangular. In one exemplary embodiment shaft 12 includes honeycomb or other shaped reinforcements to strengthen shaft 12. The same honeycomb or other shaped reinforcements may also be included in holding portion 17.

First and section friction areas 14, 16 may comprise a composition coupled to shaft 12, a pattern in the material of shaft 12 (i.e., grooves, bumps, etc.), shaft 12 comprising different materials, or any other way to adjust the friction of shaft 12. In an exemplary embodiment, second friction area 16 comprises grooves on the bottom of shaft 12 and first friction area 14 comprises a composition coupled to the end of shaft 12, preferably silicone (shown in FIGS. 1 and 2). In a first alternative embodiment, shaft 12 comprises different materials such that first and second friction areas 14, 16 comprise one material, and the remainder of shaft 12 comprises a different material. Alternatively, first friction area 14 can comprise a different material than second friction area 16. In a second alternative embodiment, shaft 12 is comprised of a single material, first friction area 14 comprises a pattern in shaft 12 (i.e., grooves, bumps, etc.), and second friction area 16 comprises a composition coupled to the bottom of shaft 12. The disclosure and claims extend to any combination of any number of ways to adjust the friction of shaft 12. Although silicone is discussed herein as an exemplary embodiment of the composition, the disclosure and claims extend to any composition that increases the friction between end shaft 12 and the inside of a ladder rung. The term "friction area" as used in the disclosure and claims herein means an area of the shaft that can contact the inside of a ladder rung when the paint can holder is secured to the ladder.

Figure 4:
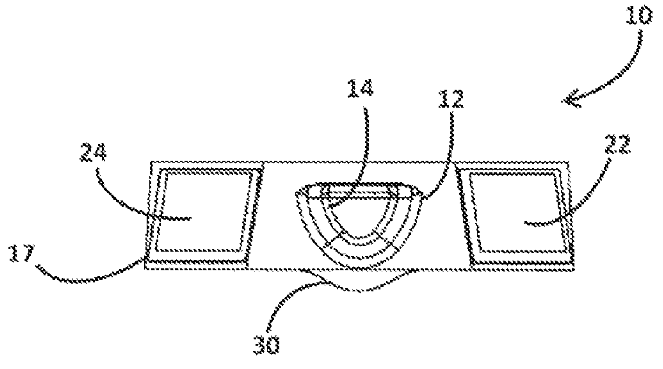
FIG. 4 shows a back view of the paint can holder of FIG. 1.
Figure 5:
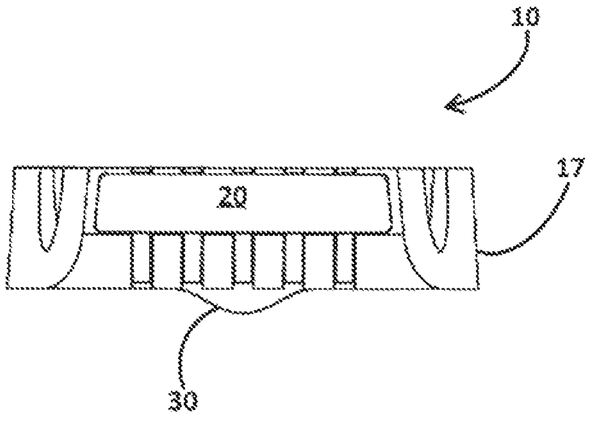
FIG. 5 shows a front view of the paint can holder of FIG. 1.

Holding portion 17 comprises groove 18, front magnetic area 20, left magnetic area 22, right magnetic area 24 (shown in FIGS. 3 and 4), first opening 26, second opening 28, and alignment portion 30 (shown in FIGS. 2, 4, and 5). Groove 18 is configured to receive and securely retain a handle from a paint can or paint bucket. In an exemplary embodiment, groove 18 is coated in a composition to increase friction between groove 18 and the paint can handle. The composition is preferably silicone, although the disclosure and claims extend to any composition that increases the friction between groove 18 and the paint can handle. In a first alternative embodiment, groove 18 can be shaped in any way to securely hold a paint can handle, including being molded to form fit the paint can handle, bumps or tabs that hold the paint can handle in groove 18, or any other way to retain a paint can handle in groove 18. In a second alternative embodiment, the paint can handle is held in groove 18 by gravity alone.

In an exemplary embodiment, holding portion 17 includes front magnetic area 20, left magnetic area 22, and right magnetic area 24. In an exemplary embodiment, left magnetic area 22 is opposite right magnetic area 24. Front magnetic area 20, left magnetic area 22, and right magnetic area 24 are optional features of paint can holder 10, and paint can holder 10 can include any combination of magnetic areas 20, 22, 24. Front magnetic area 20 is operable to secure a paintbrush or paint scraper to the front side of holding portion 17. Left magnetic area 22 is operable to secure a paintbrush or paint scraper to the left side of holding portion 17. Right magnetic area 24 is operable to secure a paintbrush or paint scraper to the right side of holding portion 17. Front magnetic area 20, left magnetic area 22, and right magnetic area 24 can each be comprised of a single magnet or multiple magnets of any strength or orientation sufficient to hold a paintbrush, wire brush, or paint scraper.

The magnets in magnetic areas 20, 22, 24 are attached to holding portion 17 in any suitable way to secure the magnets to holding portion 17, including stamped sheet metal, fasteners, welding or glue, holding portion 17 being molded to secure the magnets (i.e., tabs, compression fit, etc.), forming holding portion 17 with magnets inside, etc. This includes any pattern of magnets in magnet areas 20, 22, 24. An example of suitable magnets for magnetic areas 20, 22, and 24 are grade N42 Super Strong Neodymium Magnets manufactured by Shenzhen Hanfang Magnet Electron Co., Ltd. located in Shenzhen, China. Another suitable example is grade C8 Hard Ferrite Ceramic Magnets manufactured by Shenzhen Hanfang Magnet Electron Co., Ltd. located in Shenzhen, China. The disclosure and claims extend to any type of magnet that can be secured to holding portion 17 with sufficient strength and orientation to hold a paintbrush or paint scraper securely to holding portion 17.

In one exemplary embodiment, first opening 26 is large enough to receive a person's hand, and operates to provide a handle to manipulate paint can holder 10 in and out of rungs on a ladder. Although first opening 26 is not specifically configured or intended to hold any specific accessory and typically first opening 26 is vacant, it is contemplated that a user could place an accessory or other object into first opening 26. Opening 28 is configured to hold a paintbrush, wire brush, or paint scraper.

Alignment portion 30 on the bottom of paint can holder 10 aligns paint can holder 10 with a paint can with its handle in groove 18 when paint can holder 10 is not inserted in a ladder. Alignment portion 30 engages a lip of the paint can, making it so that the paint can handle remains in groove 18 when paint can holder 10 is not inserted in a ladder. This allows a user to remove paint can holder 10 from the ladder, set the paint can holder/paint can on the ground, then pick up the paint can holder/paint can without having to adjust the positioning of the paint can holder on the paint can.

Shaft 12 and holder portion 17 are coupled to each other such that they form a single integrated unit. In an exemplary embodiment, shaft 12 and holder portion 17 are a single molded piece. In an alternative embodiment, shaft 12 and holder portion 17 are separate pieces that are coupled together by any means known in the art, including but not limited to welding and fasteners.

In one exemplary embodiment, paint can holder 10 is comprised of a polymer plastic, preferably a reinforced acrylonitrile butadiene styrene (ABS) plastic. In an alternative embodiment, paint can holder 10 is comprised of ABS 757. The disclosure and claims herein extend to any suitable material for paint can holder 10.

Paint can holder 10 securely fastens a paint can and accessories to a ladder. Shaft 12 is inserted into a hollow rung of a ladder. In one exemplary embodiment, shaft 12 is completely inserted into the rung of a ladder such that the back side of holding portion 17 is in contact with the ladder. In an alternative embodiment, only a portion of shaft 12 is inserted into the rung of a ladder. A paint can is attached to paint can holder 10 by placing the handle of the paint can in groove 18. The paint can may be attached to paint can holder 10 before or after shaft 12 is inserted into the rung of the ladder. The weight of the paint can, the accessories, or even holding portion 17 causes shaft 12 to pivot inside the rung and become leveraged inside the rung such that the first and second friction areas contact the inside of the rung and hold the paint can holder securely in place. Thus, to secure paint can holder 10 to a ladder, a user simply inserts shaft 12 into the rung and releases the paint can holder. Further, by simply lifting and pulling, paint can holder 10 can easily be removed from the ladder.

The paint can holder as described and claimed herein provides a number of benefits over the prior art. First, a user can operate paint can holder 10 with an attached paint can with one hand to insert paint can holder 10 into a ladder and remove paint can holder 10 from a ladder. Second, paint can holder 10 is a single piece and does not require assembly by the user, and in an exemplary embodiment, is a single molded piece. Third, paint can holder 10 securely attaches a paint can and accessories to a ladder, and users have confidence that paint can holder 10 is secure and steady. Fourth, paint can holder 10 is easy to use—it does not require complex steps to attach a paint can to paint can holder 10 or to secure paint can holder 10 to the ladder. A user simply places the handle of a paint can in groove 18 and inserts shaft 12 into the rung of a ladder. Fifth, the alignment portion allows paint can holder 10 to stay in place on a paint can when the paint can holder is not affixed to the ladder. Thus a user can place a paint can handle in the groove, pick up the paint can holder and the paint can with one hand, insert the shaft into the ladder, and the paint can is secure. The user can also remove the paint can and paint can holder with one hand from the ladder, place the paint can on the ground, and the paint can holder will remain aligned with the paint can such that the user can easily pick up the paint can and paint can holder with one hand again.

From the foregoing it will be seen that this invention is one well adapted to attain all ends and objectives herein-above set forth, together with the other advantages which are obvious and which are inherent to the invention.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A paint can holder for attachment to a ladder, comprising:

a holding portion having a wider outer edge and a narrower inner edge with oppositely angled side edges extending therebetween, with a recessed groove extending along said outer edge and an alignment tab protruding from a bottom surface of said holding portion, wherein said groove is configured to receive a handle of a paint can and said protruding alignment tab is configured to engage with a lip of said paint can, wherein said holding portion defines a first rectangular opening adjacent said recessed groove and a second rectangular opening adjacent said narrower edge; and a single D-shaped shaft extending outwardly from said narrow edge of said holding portion, said shaft comprising upper and lower surfaces in fixed relationship, at least a portion of said upper surface comprising upper edges of a plurality of honeycomb shaped reinforcements disposed within said D-shaped shaft wherein said upper and lower surfaces are configured to engage with an interior of a rung of said ladder such that frictional contact between said surfaces and an inner surface of a rung of said ladder secures said paint can holder therein, and wherein said holding portion and said shaft comprise a unitary molded piece.

2. The paint can holder of claim 1 wherein at least a portion of said upper surface comprises a first friction area and said lower surface comprises a second friction area, and wherein said first friction area comprises a composition disposed on said shaft.

3. The paint can holder of claim 2 wherein said composition is silicone.

4. The paint can holder of claim 2, wherein said second friction area comprises a plurality of ridges formed in said lower surface.

5. The paint can holder of claim 2 wherein said first friction area covers only a portion of said upper surface.

6. The paint can holder of claim 5 wherein said first friction area covers from about 5 percent to about 33 percent of said upper surface.

7. The paint can holder of claim 2 wherein said second friction area covers only a portion of said bottom lower surface.

8. The paint can holder of claim 7 wherein said second friction area covers from about 5 percent to about 33 percent of said lower surface.

9. The paint can holder of claim 1 wherein at least one of said first and second openings is configured to hold a paintbrush, a wire brush, or a paint scraper.

10. The paint can holder of claim 1 further comprising at least one magnetic area affixed to at least one of said side edges of said holding portion.

11. The paint can holder of claim 10 wherein said at least one magnetic area comprises a first magnetic area affixed to a first side edge and a second magnetic area affixed to a second side edge of said holding portion.

12. The paint can holder of claim 1 wherein said groove is coated with a composition.

13. The paint can holder of claim 12 wherein said composition is silicone.

* * * * *